3,325,286
PHOTOGRAPHIC EMULSIONS AND ELEMENTS
Robert William Nottorf, Westfield, N.J., assignor to E. I.
du Pont de Nemours and Company, Wilmington, Del.,
a corporation of Delaware
No Drawing. Filed Aug. 28, 1961, Ser. No. 134,109
The portion of the term of the patent subsequent to
July 28, 1981, has been disclaimed
28 Claims. (Cl. 96—87)

This invention relates to photographic silver halide emulsions. More particularly it relates to improved emulsion layers for lithographic films. The invention also relates to photographic elements bearing such an emulsion layer.

Light-sensitive silver halide emulsion layers used by the graphic arts industry for the production of lithographic plates must meet very high standards. The standards set for the physical, dimensional and photographic properties of such emulsion layers are particularly rigorous. Existing lithographic emulsion layers, however, only partially meet these requirements.

It is therefore an object of this invention to provide a light-sensitive lithographic emulsion which when coated as a layer on a support exhibits improved dimensional stability, flexibility, impact resistance and anchorage, as well as improved photographic contrast, halftone dot quality and development and exposure latitude. Another object is to provide such an emulsion comprising a novel combination of constituents. A further object is to provide such an emulsion which is readily adapted to existing emulsion manufacturing techniques and which is capable of being coated with improved uniformity. Still other objects will be apparent from the following description of the invention.

The novel, improved light-sensitive silver halide emulsion of this invention has a binding material which comprises a mixture of gelatin and an aqueous dispersion of a polymeric vinyl compound and at least one anionic dispersing agent represented by the formula:

A—B wherein A is an organic radical selected from the group consisting of a straight chain alkyl radical of at least 8 carbon atoms, e.g., 8 to 18 carbon atoms, and an organic radical of the formula

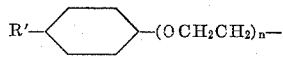

wherein R' is a branched-chain alkyl radical of at least 4 carbon atoms, e.g., 4 to 12 carbon atoms, and $n$ is a number of 1 to 12, and B is a radical selected from the group consisting of —$O_m$—$SO_3M$ and —$CO_2M$ wherein M is a cation selected from the group consisting of ammonium and an alkali metal, e.g., lithium, sodium, potassium, rubidium and cesium and $m$ is a number of 0 and 1, said emulsion containing a polyoxyethylene compound of the formula:

$$RO(CH_2CH_2O)_nR_1$$

wherein R is a hydrogen, alkyl of 1 to 18 carbon atoms, aryl of 6 to 12 carbon atoms, alkylaryl of 7 to 18 carbon atoms and arylalkyl of 7 to 18 carbon atoms, $R_1$ is hydrogen and alkyl of 1 to 3 carbon atoms and $n$ is a number of 6 to 2500. The emulsion preferably contains, per mole of silver halide, 40 to 80 grams of gelatin, 10 to 60 grams of the polymeric vinyl compound based on the weight of initial monomer in the polymerization reaction mixture and 0.2 to 2.5 grams of the polyoxyethylene compound.

The preferred polymeric vinyl compound is an acrylic acid ester taken from the group consisting of a homopolymer of an acrylic acid ester, a homopolymer of an α-hydrocarbon substituted acrylic acid ester and a copolymer of said acrylic acid esters, said copolymer containing at least 90% by weight of units of said acrylic acid esters.

In a preferred embodiment of this invention an aqueous silver bromochloride lithographic emulsion containing a reduced amount of gelatin, as set forth below, is sensitized and digested in a manner familiar to those skilled in the art. After digestion, but prior to coating, there is added to the emulsion an aqueous acrylic acid ester polymeric dispersion containing an anionic dispersing agent and a polyoxyethylene compound, of the types described above. The emulsion is then coated to form an emulsion layer on a suitable support such as a cellulose ester or polyester photographic film base. The coating is dried, exposed sensitometrically through a neutral density wedge, processed by developing, fixing, etc., and the image densities read on a conventional type of densitometer. The sensitometric behavior of the coating is essentially equivalent to that of conventional coatings such as those in which gelatin is the sole binder. The coating exhibits considerable improvement over conventional coatings, however, in its dimensional stability and halftone dot quality.

In a particularly preferred embodiment, at least one dispersing agent or surfactant, other than the anionic type used in dispersing the vinyl polymer, is incorporated into the emulsion via a separate addition. An especially useful surfactant is an amphoteric compound of the formula:

$$RNH_p[(CH_2)_nCOOM]_m$$

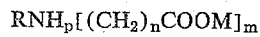

wherein R is an unsubstituted alkyl group of 12 to 18 carbon atoms, $m$ and $n$ are numbers of 1 and 2, $m$ being preferably 1, $p$ is a number of 2 minus $m$ and M is a cation taken from the group consisting of sodium, potassium, ammonium and hydrogen.

The aqueous polymeric dispersions used in this invention are prepared in a conventional manner, starting with a polymerizable liquid monomer. This monomer is emulsified with water by means of the anionic dispersing agent described above and subjected to a conventional emulsion polymerization using a free-radical initiator, e.g., hydrogen peroxide, an organic peroxide or an azobis-nitrile compound as disclosed in U.S. Patent 2,471,959, e.g., α,α'-azobis(isobutyronitrile). In Procedure A, to follow, a description is given of the preparation of a particularly preferred dispersion, i.e., polyethyl acrylate.

The invention will be further illustrated by but is not intended to be limited to the following procedures and examples wherein the dots were evaluated for quality, the coatings were evaluated for their humidity coefficient of expansion and for their dimensional stability as follows:

The dots were evaluated microscopically for characteristics desirable in halftone reproduction, e.g., sharpness of edge, scale ranging from small to large dots, the opacity of small dots, etc. They were rated subjectively on a numerical scale, in which 1.0 is excellent,
2.0 is good,
3.0 is acceptable,
4.0 is poor, not acceptable.

Decimals are used to estimate intermediate quality.

The coatings were also evaluated for their humidity coefficient of expansion (cm. change per cm. of film length per 1% change in relative humidity) and for their dimensional stability (processing size change in cm. change per cm. of film length) when put through a conventional processing cycle, including drying.

In determining humidity coefficient of expansion, a 30-inch strip of a coating is scribed with a sapphire microgroove recording stylus so as to produce, near each end of the strip, fiducial marks which will be in close proximity to the fiducial marks of a calibrated nickel steel plate (e.g., Invar) when the strip and plate are brought into contact with one another. The strip is then conditioned for 24 hours at a constant temperature and humidity and then, while maintained at the same conditions, placed in flat contact with the nickel steel plate. Two Gaertner filar micrometer microscopes, having a total magnification of 100× and micrometer least count of $2 \times 10^{-5}$ inches, are mounted so that measurements may be obtained by means of a graduated glass scale of distances between the fiducial marks on the coating strips and the corresponding fiducial marks on the nickel steel plate. The steel plate, microscopes and coating strip are all housed in a conditioning cabinet equipped with arm ports and viewing windows. By vector addition of these distances and the known distance between the fiducial marks on the nickel steel plate, the distance is determined between the two fiducial marks on the strip at a known humidity. The process is repeated, with 24-hour preconditioning, to determine the distance between the strip's two fiducial marks at another known humidity. The change in length at the two humidity values divided by the average of the two lengths and divided by the difference in percent relative humidity gives the humidity coefficient of expansion.

Dimensional stability in terms of processing size change is determined in a very similar manner. Distance between fiducial marks is determined on a coating strip which has been conditioned under constant temperature and humidity for 24 hours. The strip is then conventionally processed and dried, conditioned at the previous constant temperature and humidity for 24 hours, and measured to determine the change in distance between fiducial marks. The processing size change is calculated by dividing this change in distance by the average distance.

"Effective contrast" in the tables is determined by drawing a straight line between the net optical densities of 0.3 to 3.5 on the net optical density vs. logarithm of the exposure plot and taking the tangent of the angle formed between the straight line and the log exposure axis.

PROCEDURE A

A 22-liter fluted, chemically resistant, glass reaction vessel was equipped with a thermometer, anchor stirrer, three-neck adapter containing a gas inlet tube and two reflux condensers. The system was purged with nitrogen for 10 to 20 minutes and maintained under a positive nitrogen pressure throughout the polymerization. To the vessel were added 8 liters of distilled water and 16.7 g. of a high molecular weight polyacrylamide (to serve as a thermal stabilizer), which was added slowly through a long stem funnel of narrow bore and washed in with 2.5 liters of distilled water. The mixture was stirred for 2 to 3 hours at room temperature to effect solution. To the solution of polyacrylamide in the vessel were added 667 g. of a 30% by weight aqueous solution of sodium lauryl sulfate which was washed in with 400 ml. of distilled water and 1000 g. of ethyl acrylate from which the polymerization inhibitor had been removed by extraction with alkali. The stirred reaction mixture was heated by a water bath to 80–85° C., was held for 10 min. in this temperature range and was cooled to 75° C. To the reaction mixture was added 16 ml. of a 30% by weight aqueous solution of hydrogen peroxide and the temperature was held at 75° C. until the polymerization was initiated. Foaming was controlled by moderating with cold water. After the initial exothermic reaction had subsided, 1000 g. of ethyl acrylate and 16 ml. of a 30% by weight aqueous solution of hydrogen peroxide were added. This process was repeated until the total amounts of ethyl acrylate and hydrogen peroxide added were respectively 5000 g. and 80 ml. After the fifth stage of the polymerization had subsided, the temperature was raised to 80–85° C. and held in this range for 2 hours. The dispersion was then heated to 90° C., held for 10 minutes and steam distilled for 1 to 2 hours to remove the residual monomer. The dispersion was cooled to about 50° C. and filtered through felt to remove any residue. The composition by weight of the polymeric dispersion made by this procedure is 30% polyethyl acrylate and 1.2% sodium lauryl sulfate.

Similar results are obtained when methyl methacrylate is used in place of the ethyl acrylate and lithium, cesium and rubidium are used in place of the sodium in the lauryl sulfate.

PROCEDURE B

A 22-liter fluted vessel was equipped and purged with nitrogen as described in Procedure A. A solution of high molecular weight polyacrylamide (thermal stabilizer) was prepared, also as described in Procedure A. To the solution of polyacrylamide in the vessel were added 667 g. of a 30% by weight aqueous isopropanol solution of a dispersing agent of the formula

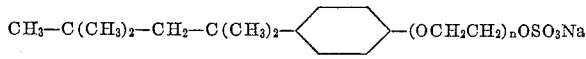

wherein $n$ is a number 2 to 6 which was washed in with 400 ml. of distilled water and 3300 g. of butyl acrylate (from which the polymerization inhibitor had been removed by extraction with alkali). The stirred reaction mixture was heated by a water bath to 80–85° C., held for 10 minutes in this temperature range and cooled to 75° C. To the reaction mixture was added 60 ml. of a 30% by weight aqueous solution of hydrogen peroxide and the temperature was held at 75° C. until the polymerization initiated. After moderating with cold water as required to control excessive foaming and the initial exothermic reaction had subsided, 1700 g. of butyl acrylate were added to the vessel. The bath temperature was adjusted to 75±3° C. and 19 ml. of a 30% by weight aqueous solution of hydrogen peroxide was added. After the second stage of the polymerization had subsided, the temperature was raised to 80–85° C. and held in this range for 2 hours. The removal of residual monomer by steam distillation and filtration were then carried out as described in Procedure A. The composition by weight of the dispersion made by this procedure is 30% polybutyl acrylate and 1.2% polyether sulfate surfactant.

PROCEDURE C

Procedure B was essentially repeated except that 200 g. of sodium stearate which was washed in with 867 ml. of distilled water was used in place of the sodium salt of an alkyl aryl polyether sulfate. A two stage polymerization was carried out with styrene being used in place of butyl acrylate and the bath temperature was maintained at 80° C. instead of 75° C. The composition by weight of the dispersion made by this procedure is 30% polystyrene and 1.2% sodium stearate.

PROCEDURE D

To the reaction vessel, purged with nitrogen as described in Procedure A, there were added 10 liters of distilled water, 50 g. of gelatin (serving as a thermal stabilizer) and 716 g. of a 28% by weight aqueous solution of a dispersing agent (surfactant) of the formula

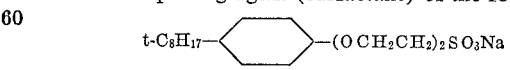

washed in with 714 ml. of distilled water. The mixture was allowed to soak at room temperature with moderate agitation for 10–15 minutes. Then the stirred mixture was heated by a water bath to 50–55° C. for 15–20 minutes to effect solution and cooled to 25° C. To the aqueous solution in the vessel was added a mixture of monomers from which the polymerization inhibitor had been removed by extraction with alkali consisting of 2310 g. of vinylidene chloride and 990 g. of 2-ethylhexyl acrylate. The stirred reaction mixture was heated by a water bath to 25–30° C., held for 10 minutes in this temperature range and cooled to 25° C. To the reaction mixture were then added 89 g. of a 25% by weight aqueous solution of ammonium persulfate and 45 g. of a 25% by weight aqueous solution of sodium metabisulfite. The temperature was held at 25–30° C. until the polymerization initiated. After moderating with cold water to control excessive foaming and the initial exothermic reaction had subsided, a mixture of monomers similar to that previously added consisting of 1190 g. of vinylidene chloride and 510 g. of 2-ethylhexyl acrylate were added to the vessel. In addition, there were added 44 g. of a 25% by weight aqueous solution of ammonium persulfate and 22 g. of a 25% by weight aqueous solution of sodium metabisulfite. The temperature was maintained at 25–30° C. and held in this range for 2 hours. The removal of residual monomer and filtration were then carried out as described in Procedure A. The composition by weight of the dispersion made by this procedure is copolyvinylidene chloride (21% by weight)/2-ethylhexyl acrylate (9% by weight) and 1.2% by weight sodium salt of the alkyl aryl polyether sulfonate.

*Example I*

A lithographic emulsion having a silver halide composition of 30 mole percent AgBr and 70 mole percent AgCl and having 20 grams of gelatin present per mole of silver halide for the steps of precipitation and ripening was freed of unwanted, soluble, by-product salts by a coagulation and wash procedure as taught in U.S. Patent 2,489,341, wherein the silver halide and most of the gelatin were coagulated by an anionic wetting agent, sodium lauryl sulfate, using an acid coagulation environment. Following the washing step, the emulsion coagulate was redispersed in water together with 47 grams of additional bulking gelatin. This redispersed emulsion was treated with a conventional sensitizer and an optical sensitizer to confer sensitivity to green light, was digested at 55° C. to increase sensitivity, was cooled to a holding temperature of about 38° C. and treated with conventional post-sensitization additives and stabilizers such as additional halide, antifogger, etc., as is common in the art. There was also added to the emulsion, per mole of silver halide, 16.7 ml. of a 10% aqueous solution of a polyoxyethylene compound which has the formula:

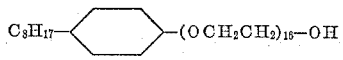

Following these additions, the sample was divided into two equal portions by weight. The first portion served as the control with no further additions. To the second portion there was added, per mole of silver halide, 74 ml. of an aqueous dispersion of polyethyl acrylate, prepared as described in Procedure A. The emulsions thus prepared were coated on polyethylene terephthalate photographic film base overcoated on both sides with a vinylidene chloride/methyl acrylate/itaconic acid copolymer, as described in Example IV of Alles, U.S. Patent 2,779,684, on which had been coated on both sides a thin anchoring substratum layer of gelatin (0.5 mg./dm.²) over which, on the backing side, there had been coated an antihalation dye-containing layer containing, on a dry weight basis, approximately 75% gelatin and 25% polyethyl acrylate dispersed as disclosed in Procedure A. Both coatings provided a silver halide coating weight equivalent to about 51 mg. of silver per square decimeter when dry. Subsequently, there was overcoated a thin, gelatin-containing antiabrasion layer as is common in the art. Samples of these of these coatings, together with a sample of a commercial lithographic film to serve as a reference, were given a 20-second, intensity-scale sensitometric step wedge exposure to a white light tungsten source. The exposure in each successive step increased by the factor of the fourth-root-of-two. The exposed samples were developed for 2½ minutes in the following lithographic developer to determine their sensitomertic characteristics:

| | | |
|---|---|---|
| Water | cc | 500 |
| Na₂SO₃, anhydrous | g | 30.0 |
| Paraformaldehyde | g | 7.5 |
| NaHSO₃ | g | 2.2 |
| Boric acid | g | 7.5 |
| Hydroquinone | g | 22.5 |
| KBr | g | 1.6 |
| Water to make 1.0 liter. | | |

Other samples of these coatings were exposed to a ruled glass halftone screen in an apparatus simulating the conditions used in the preparation of halftone copies, and similarly developed 2½ and 3 minutes, respectively, to determine their ability to yield good halftone dots. After development the coatings were treated in a conventional acid hardening and fixing bath containing 153 g. anhydrous Na₂S₂O₃ per liter, washed in tap water, and dried in a conventional manner. The sensitometric characteristics of these coatings are tabulated below, with a commercial lithographic film serving as a control.

TABLE I

| Polymeric Dispersion Added | Sensitometric Properties, 2½ Minute Development | | | Halftone Dot Quality at Development Time | |
|---|---|---|---|---|---|
| | Fog | Relative Sensitivity | Effective Contrast | 2½ min. | 3 min. |
| None | .01 | 100 | 10.0 | 1.3 | 2.3 |
| Polyethyl Acrylate | .01 | 102 | 10.1 | 1.4 | 2.4 |
| Commercial Lithographic Film | .01 | 80 | 5.4 | 2.5 | 3.5 |

It was observed that the sample containing a polyethyl acrylate dispersion in combination with the polyoxyethylene compound exhibited good sensitometric characteristics and halftone dot quality. It is particularly effective in maintaining good dot quality over an extended range of development times, which enhances the working latitude of the film in use.

The dimensional characteristics of the improved gelatin-silver halide emulsion layers of this invention containing the polyethyl acrylate dispersion described above in this example were evaluated and compared with a control emulsion layer from which the polyethyl acrylate was omitted. These emulsion layers, which had the same low gelatin content, were also compared for dimensional stability with the commercial lithographic control used above in which the gelatin content was considerably higher (113 g. per mole of silver halide) and which had no polyethyl dispersion in either the emulsion or the antihalation layers.

| | Humidity Coefficient of Expansion | Processing Size Change |
|---|---|---|
| Control emulsion with reduced gelatin | 1.8×10⁻⁵ | 1.6×10⁻⁴ |
| Emulsion with reduced gelatin plus polyethyl acrylate | 1.5×10⁻⁵ | 1.1×10⁻⁴ |
| Commercial lithographic film | 2.0×10⁻⁵ | 2.0×10⁻⁴ |

It has been found that be reducing the gelatin content of the emulsion and/or adding a polymeric dispersion of the preferred type an emulsion having consistently improved dimensional stability relative to normal all-gelatin controls is obtained.

Example II

Example I was essentially repeated except that, in addition to the polyoxyethylene and polyethyl acrylate additions, there was also added (per mole of silver halide) 4 ml. of a 10% by weight aqueous solution of an amphoteric dispersing agent, sodium-N-coco-$\beta$-aminopropionate, in which the predominant fraction of "coco" is dodecyl. The resultant film of this example was processed along with the experimental film of Example I and the tabular comparison below illustrates the desirable effect in improving halftone dot quality when the polyoxyethylene compound is employed in conjunction with the amphoteric dispersing agent.

TABLE II

| Amphoteric Dispersing Agent | Sensitometric Properties, 2½ Minute Development | | | Halftone Dot Quality at Development Time | |
|---|---|---|---|---|---|
| | Fog | Relative Sensitivity | Effective Contrast | 2½ min. | 3 min. |
| Absent | .01 | 100 | 10.1 | 1.2 | 2.4 |
| Present | .01 | 95 | 10.6 | 1.0 | 1.6 |

Example III

An aqueous gelatino-silver bromochloride lithographic emulsion prepared through the stages of sensitization described in Example II, and with the addition of a polyoxyethylene compound and an amphoteric dispersing agent also as described in that example, was divided into a number of portions just prior to coating. To each portion was added an aqueous dispersion of a vinyl polymer dispersed with an anionic dispersing agent as described in one of the various procedures above in an amount equal to 74 ml. of polymeric dispersion per mole of silver halide in the emulsion. These emulsions were then coated on a dimensionally stable polyethylene terephthalate film base as described in Example I except that the antihalation dye-containing layer coated on the backing side was replaced by a gelatin antihalation layer containing no polyethylacrylate dispersion. The emulsion coatings were then dried and tested for photographic speed, contrast, and dot quality as previously described, with the results being tabulated below.

TABLE III

| Vinyl Polymer Dispersion Prepared According to Procedure | Relative Speed | Effective Contrast | Halftone Dot Quality at Development Time | |
|---|---|---|---|---|
| | | | 2½ min. | 3 min. |
| None (control) | 100 | 10.0 | 1.0 | 1.5 |
| Procedure B (polybutyl acrylate) | 112 | 9.8 | 1.2 | 1.7 |
| Procedure C (polystyrene) | 106 | 10.1 | 1.2 | 1.5 |
| Procedure D (Copolyvinylidene chloride/2-ethylhexyl acrylate) | 100 | 9.6 | 1.0 | 1.8 |

It is noted that all of the samples containing polymeric dispersion have speed and effective contrast very nearly like the control and that all attain an excellent rating in halftone dot quality. Also all of the films containing a polymeric dispersion have improved dimensional stability relative to the all-gelatin control with the values being similar to those shown for the films of Example I.

Example IV

To an aqueous gelatino-silver bromochloride lithographic emulsion, prepared through the stages of sensitization and with the addition of an amphoteric dispersing agent as described in Example II, there was added, per mole of silver halide, 150 ml. of an aqueous dispersion of polyethyl acrylate, prepared as described in Procedure A. The sample was divided into a number of portions just prior to coating and to each portion (except the control) there were added various polyoxyethylene compounds as 1% by weight aqueous solution so as to give the concentrations, based on silver halide concentration, indicated in the table below. The emulsions were coated and tested as in Example I with the results being tabulated below.

| Film | Polyoxyethylene Derivative Added | G./mole of Silver Halide | Relative Speed | Effective Contrast | Halftone Dot Quality at Development Time | |
|---|---|---|---|---|---|---|
| | | | | | 2½ min. | 3 min. |
| 1 | None | | 100 | 7.0 | 3.0 | 4.0 |
| 2 | a | .033 | 100 | 10.0 | 2.0 | 3.0 |
| 3 | a | .067 | 76 | 10.5 | 2.3 | 3.8 |
| 4 | b | .4 | 98 | 9.6 | 2.0 | 3.8 |
| 5 | b | .5 | 84 | 10.6 | 2.0 | 3.8 |
| 6 | c | 1.0 | 87 | 9.4 | 2.3 | 3.0 |
| 7 | c | 1.67 | 66 | 9.0 | 2.0 | 2.0 |
| 8 | d | 1.0 | 87 | 9.4 | 2.0 | 2.0 |
| 9 | d | 1.67 | 64 | 9.8 | 1.5 | 1.7 |
| 10 | e | .266 | 71 | 9.2 | 2.0 | 2.3 |
| 11 | e | .40 | 60 | 9.2 | 1.6 | 1.4 |
| 12 | f | .133 | 81 | 9.6 | 3.0 | 3.8 |
| 13 | f | .25 | 81 | 9.5 | 2.3 | 2.1 |

In the above table, the polyoxyethylene derivatives, coded a, b, c, d, e and f, have the general formula:

$$RO(CH_2CH_2O)_nR_1$$

where the values of $n$, R and $R_1$ are as follows:

| Code | n | R | $R_1$ |
|---|---|---|---|
| a | 80 | H | H |
| b | 6–7 | Octyl | H |
| c | 9–10 | Octylphenyl | $CH_3$ |
| d | 16 | ----do---- | H |
| e | 30 | ----do---- | H |
| f | 2300 | H | H |

Considerable latitude is possible in the choice of the polymeric vinyl compound used in the dispersion. A preferred class of polymers are the alkyl acrylates and methacrylates, e.g., polymers and copolymers of methyl, ethyl, butyl, ethylhexyl acrylate or methyl and butyl methacrylate. In addition, acrylic acid can be used in the preparation of the copolymers provided no more than 10 mole percent of such acid is used in the polymerization with the other constituents. Other useful classes of vinyl monomers used to prepare the water soluble polymeric and copolymeric dispersions are the vinyl esters such as the acetate, propionate, etc.; the vinyl and vinylidene halides such as vinylidene chloride; styrene and substituted styrenes; the dienes such as butadiene; acrylonitrile; alkenes such as ethylene or propylene and the like.

In general, best results are obtained with vinyl monomers which yield the lowest water sensitivity and lowest modulus of elasticity. Thus acrylates will generally be preferable to methacrylates and polyethylene to polyvinylidene chloride polymers and copolymers.

A critical characteristic of the dispersion is the particle size since the intended application requires freedom from light scattering. Particle size may be controlled by techniques of emulsion polymerization known in the art such as the use of adequate concentration of surfactants, the mode of stirring, the concentrations of reactants, temperature, rate of addition of monomers, etc. For most applications particle sizes below 100 m$\mu$ are desirable, but for less critical uses particle sizes up to 1$\mu$ are permissible.

While emulsion polymerization at ordinary pressures is a convenient technique for obtaining fine dispersions with the preferred acrylate esters, polymerizations under pressure or other techniques which yield fine polymeric dispersions may be more suitable with other monomers.

Suitable anionic dispersing agents useful in this invention include sodium lauryl sulfate, potassium cetyl sulfonate, ammonium octyl sulfate, sodium octadecyl sulfonate, sodium salts of isooctyl phenyl polyether sulfates and sulfonates in which the polyether is ethyl ether, e.g., of up to 6 units; potassium stearate, ammonium laurate, sodium palmitate, etc. The anionic surfactant is generally present in an amount of 0.5 to 15.0% by weight based on the weight of the water-insoluble vinyl polymer being dispersed. A preferred amount of the anionic compound is 3 to 5% by weight.

As indicated above an amphoteric dispersing agent of the formula:

$$RNH_p[(CH_2)_nCOOM]_m$$

can be incorporated into the emulsion via a separate addition. The dispersing agent is added in amounts ranging from 0.06 to 3.0 grams per mole of silver halide in the emulsion. Suitable such agents include amino acid types disclosed in U.S. Patent 2,816,920. Two of these dispersing agents of particular interest include disodium-N-tallow-$\beta$-iminodipropionate and the disodium salt of N-dodecyl-$\beta$-iminodipropionate. In addition, alkylaminocarboxylates, i.e., the monocarboxylates, give satisfactory results. The latter type compounds include the sodium salt of N-alkyl-$\beta$-aminopropionic acid wherein the alkyl group contains 8 to 18 carbon atoms.

A number of polyoxyethylene derivatives, in addition to the polyoxyethylene compounds already described, are useful in this invention. These include the derivatives disclosed in Stanton U.S. Patent 2,531,832, of the formula R—$(CH_2CH_2O)_n$—$R_1$ where R is hydrogen or an aliphatic carboxylic acyl radical of 1 to 18 carbon atoms and $R_1$ is hydrogen or an aliphatic carboxylic acid radical of 1 to 18 carbon atoms and $n$ is 9 to 200 or more; the polyoxyalkylene ethers of ring-dehydration products of hexitols as disclosed in Blake et al. U.S. Patent 2,400,532; the polyoxyethylene ethers of ring dehydration products of hexitols as disclosed in Blake U.S. Patent 2,533,990; and the oxyethylene compounds of the formula R—$(OCH_2CH_2)_x$—$OR_1$ where R is taken from the group consisting of hydrogen, alkyl and alkyl-CO— groups of 1 to 18 carbon atoms, $R_1$ is taken from the group consisting of alkyl and alkyl-CO— groups of 1 to 18 carbon atoms and $x$ is 6 to 18. It is understood that the value for $n$ in the polyoxyethylene compounds, i.e., 6 to 2500, is an average value because the compounds are mixtures of various weight polymers. Also useful are the bis type compounds, e.g. $(CH_2)_{10}[O(CH_2CH_2O)_nCH_2CH_2OH]_2$ as disclosed in U.S. 2,756,147. Here the sum of the 2 $n$'s should have a value from 6 to 2500.

Although the preferred emulsions of this invention contain silver halide grains of bromochloride containing at least 50 mole percent chloride, some of the advantages, e.g., dimensional stability, etc., may be realized, where desirable, in aqueous gelatin emulsions containing other types of silver halide grains, e.g., bromide, iodobromide, iodochloride, etc., and mixtures thereof, such as are used in cine negative, radiographic, microfilm, recording and astronomical films.

The aqueous gelatino-silver halide emulsions useful in the invention may be prepared by various procedures, e.g., by standard precipitation of silver halide, gelling, washing, sensitization and digestion operations or by precipitating with an anion soap a gelatino-silver halide coagulum and subsequently washing, redispersing with additional gelatin in an aqueous medium and digesting. A large number of anion soaps are useful in the emulsion preparation. The classification of these compounds is discussed in the book "Kolloidchemische Grundlagen der Textilveredlung" by Dr. E. Valko, 1937, at pages 519–522, to which reference is made for the meaning of the expression "anion soaps." Generally the class also includes soluble salts of long-chain alkyl carboxylic acids, e.g., soluble salts of faty acids containing eight or more carbon atoms as, for example, lauric, oleic, ricinoleic, linoleic, stearic and palmitic. These compounds, however, are less satisfactory than long chain alkyl sulfates and sulfonates. Soluble salts of long-chain alkyl sulfonic acids, soluble salts of sulfated higher fatty alcohols in which the alkyl group contains at least 8 carbons and many other sulfonated and sulfated aliphatic and aromatic compounds which are water soluble and contain from 10 to 20 carbon atoms are suitable complexing agents.

The present invention is not limited to the use of a particular film base support as the emulsions may be coated on various films and plates composed of glass, metal, e.g., aluminum, various waterproof papers, cellulose derivatives, e.g., cellulose acetate, cellulose propionate, cellulose butyrate, cellulose acetate-butyrate, and cellulose nitrate; superpolymers, e.g., nylon, polyvinyl chloride, poly(vinyl chloride co vinyl acetate), polystyrene, polymethylene terephthalates, polycarbonate, e.g., the polycarbonate of 2,2-bis-p-hydroxyphenyl propane, polyethylene terephthalate/isophthalate, etc. The polyester films include those prepared from highly polymerized esters of terephthalic acid and at least one glycol of the formula $HOCH_2$—W—$CH_2OH$ where W is polymethylene or alkyl substituted polymethylene of 0 to 8 carbons, e.g., 2,2-dimethylpropylene-1,3 or a cycloalkylene radical of 5 to 6 carbon atoms, e.g., cyclopentyl-1,3, and cyclohexyl-1,4. Films comprising up to 20 mole percent of aliphatic dicarboxylic acids based on total moles of acids, e.g., succinic, glutaric, adipic, hexahydroterephthalic and sebacic acids, in addition to at least 15 mole percent terephthalic acid are also useful. The above-described polymers may contain a number, e.g., 1 to 12 or more, of ether groups in the polymer chain. Such ether groups may be added as part of ether containing glycol derivatives or formed by side reactions during polymerization.

Of course, various sublayers may be present to anchor the layer to the base as is common in photographic film and plate manufacture. A suitable example is the vinylidene chloride copolymer coated supports of Alles et al., U.S. Patent 2,627,088. Also, various other auxiliary layers may be employed such as antiabrasion layers and antihalation backing or undercoat layers. Suitable antihalation layers are disclosed in U.S. Patents 1,923,485; 2,085,736; 2,274,782; 2,282,890; etc. A preferred backing layer is prepared by mixing gelatin and an aqueous dispersion of a polymerized vinyl compound of the types disclosed above. For each 10 to 60 grams of polymer there is preferably 40 to 80 grams of gelatin in the backing layer. The ratio of polymer to gelatin can range from 10:80 to 60:40.

The emulsions may be modified by the addition of general emulsion sensitizers, e.g., alkyl thiourea, phenyl isothiocyanate, sodium thiosulfate, and alkyl isothiocyanate; metal compounds, e.g., of gold, platinum, palladium, iridium, rhodium, mercury, cadmium, thallium, etc.; antifogging agents, e.g., 2-mercaptobenzothiazole, 1-phenyl-5-mercaptotetrazole, benzotriazole, triazindenes, tetrazindenes and 5-nitrobenzimidazole; sensitizing dyes; hardeners, e.g., formaldehyde and other aliphatic aldehydes, dimethylol urea, trimethylol melamine; chrome alum and other chromium compounds; matting agents; image color modifiers and other emulsion adjuvants. These adjuvants may also be used in an auxiliary layer of a photographic element.

The novel emulsions of this invention are useful in the manufacture of lithographic photographic films possessing improved physical properties and improved edge sharpness of halftone dots, and development and exposure latitude. Film elements made from such emulsions, with additives such as silica, are also useful as offset plates in the printing industry.

An advantage of the lithographic film bearing the improved photographic emulsion is that the dimensional stability of the emulsion and the coated film element is significantly improved. Another advantage is that the film element possesses improved flexibility, impact resistance and anchorage. Yet another advantage is that by use of the anionic dispersing agents of this invention alone or in combination with other dispersing agents, polymer particles of sufficiently small size can be maintained to provide a transparent film when mixed with gelatin, coated and dried. These advantages are achieved essentially without a sacrifice in sensitometric or other physical properties of the lithographic films. Still other advantages will be apparent to those skilled in the art.

I claim:

1. A light-sensitive silver halide emulsion exhibiting improved dimensional stability and half-tone dot quality suitable for use in lithographic films, said emulsion having a binding material which comprises a mixture of gelatin and a dispersed acrylic acid ester polymeric compound selected from the group consisting of a homopolymer of an acrylic acid ester, a homopolymer of an α-hydrocarbon substituted acrylic acid ester and a copolymer of said acrylic acid esters, said copolymer containing at least 90% by weight of units of said acrylic acid esters, said polymeric compound dispersed with at least one anionic dispersing agent represented by the formula:

A—B wherein A is an organic radical selected from the group consisting of a straight chain alkyl radical of at least 8 carbon atoms and an organic radical of the formula

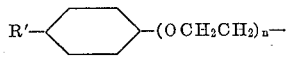

wherein R′ is a branched-chain alkyl radical of at least 4 carbon atoms and $n$ is a number of 1 to 12, and B is a radical selected from the group consisting of —O$_m$—SO$_3$M and —CO$_2$M wherein M is a cation selected from the group consisting of ammonium and an alkali metal and $m$ is a number of 0 and 1, said emulsion containing a polyoxyethylene compound of the formula RO(CH$_2$CH$_2$O)$_n$R$_1$ wherein R is hydrogen, alkyl of 1 to 18 carbon atoms, aryl of 6 to 12 carbon atoms, alkylaryl of 7 to 18 carbon atoms and arylalkyl of 7 to 18 carbon atoms, R$_1$ is hydrogen and alkyl of 1 to 3 carbon atoms and $n$ is a number of 6 to 2500.

2. A silver halide emulsion as defined in claim 1 wherein the amount of gelatin in said emulsion per mole of silver halide ranges from 40 to 80 grams.

3. A silver halide emulsion as defined in claim 1 wherein the dispersed acrylic acid ester polymeric compound is present in an amount of 10 to 60 grams based on the initial weight of monomer to form said polymer per mole of silver halide.

4. A silver halide emulsion as defined in claim 1 wherein said polyoxyethylene compound present ranges from 0.2 to 2.5 grams per mole of silver halide.

5. A silver halide emulsion as defined in claim 1 wherein said acrylic acid ester polymer is polyethyl acrylate.

6. A silver halide emulsion as defined in claim 1 wherein said acrylic acid ester polymer is polybutyl acrylate.

7. A silver halide emulsion as defined in claim 1 wherein said anionic dispersing agent is sodium lauryl sulfate.

8. A silver halide emulsion as defined in claim 1 wherein said anionic dispersing agent is

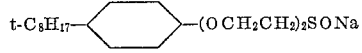

9. A silver halide emulsion as defined in claim 1 wherein said anionic dispersing agent is

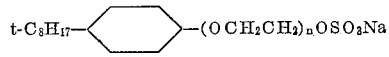

wherein $n$ is a number of 2 to 6.

10. A silver halide emulsion as defined in claim 1 wherein said anionic dispersing agent is present in an amount of 0.5 to 15% by weight based on the weight of the acrylic acid ester polymeric compound.

11. A silver halide emulsion as defined in claim 1 wherein said silver halide is silver bromochloride containing at least 50 mole percent chloride.

12. A photographic element comprising a hydrophobic support bearing at least one emulsion layer as defined in claim 1.

13. An element as defined in claim 12 wherein said support is a macromolecular polyester material.

14. An element as defined in claim 12 wherein said support is a polyethylene terephthalate film base.

15. An element as defined in claim 12 having a backing layer composed of gelatin and a dispersed polymerized vinyl compound, said gelatin and dispersed polymer being present in said backing layer in a ratio of 1:8 to 3:2.

16. A silver-halide emulsion as defined in claim 2 where said acrylic acid ester polymer is a homopolymer of an alkyl acrylate wherein said alkyl group contains from 2 to 8 carbon atoms.

17. A method of improving the dimensional stability and half-tone dot quality of a light-sensitive silver-halide emulsion to render it suitable for use in lithographic films, which method comprises incorporating in said emulsion a binding material which comprises a mixture of gelatin and a dispersed acrylic acid ester polymeric compound selected from the group consisting of a homopolymer of an acrylic acid ester, a homopolymer of an α-hydrocarbon substituted acrylic acid ester and a copolymer of said acrylic acid esters, said copolymer containing at least 90% by weight of units of said acrylic acid esters, said polymeric compound dispersed with at least one anionic dispersing agent represented by the formula:

A—B wherein A is an organic radical selected from the group consisting of a straight chain alkyl radical of at least 8 carbon atoms and an organic radical of the formula

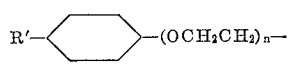

wherein R′ is a branched-chain alkyl radical of at least 4 carbon atoms and $n$ is a number of 1 to 12, and B is a radical selected from the group consisting of

and —$CO_2M$ wherein M is a cation selected from the group consisting of ammonium and an alkali metal and m is a number of 0 and 1, said emulsion containing a polyoxyethylene compound of the formula:

$$RO(CH_2CH_2O)_nR_1$$

wherein R is hydrogen, alkyl of 1 to 18 carbon atoms, aryl of 6 to 12 carbon atoms, alkylaryl of 7 to 18 carbon atoms and arylalkyl of 7 to 18 carbon atoms, $R_1$ is hydrogen and alkyl of 1 to 3 carbon atoms and n is a number of 6 to 2500.

18. A method as defined in claim 17 wherein the amount of gelatin in said emulsion per mole of silver halide ranges from 40 to 80 grams.

19. A method as defined in claim 17 wherein the dispersed acrylic acid ester polymeric compound is present in an amount of 10 to 60 grams based on the initial weight of monomer to form said polymer per mole of silver halide.

20. A method as defined in claim 17 wherein said polyoxyethylene compound present ranges from 0.2 to 2.5 grams per mole of silver halide.

21. A method as defined in claim 17 wherein said acrylic acid ester polymer is polyethyl acrylate.

22. A method as defined in claim 17 wherein said acrylic acid ester polymer is polybutyl acrylate.

23. A method as defined in claim 17 wherein said anionic dispersing agent is sodium lauryl sulfate.

24. A method as defined in claim 17 wherein said anionic dispersing agent is

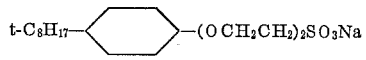

25. A method as defined in claim 17 wherein said anionic dispersing agent is

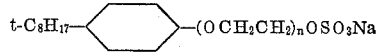

wherein n is a number of 2 to 6.

26. A method as defined in claim 17 wherein said anionic dispersing agent is present in an amount of 0.5 to 15% by weight based on the weight of the acrylic acid ester polymeric compound.

27. A method as defined in claim 17 wherein said silver halide is silver bromochloride containing at least 50 mole percent chloride.

28. A method as defined in claim 17 wherein said acrylic acid ester polymer is a homopolymer of an alkyl acrylate wherein said alkyl group contains from 2 to 8 carbon atoms.

References Cited

UNITED STATES PATENTS

| | | | |
|---|---|---|---|
| 2,468,012 | 4/1949 | Isbell | 260—534 |
| 2,484,431 | 10/1949 | Staehle et al. | 96—35 |
| 2,831,766 | 4/1958 | Knox et al. | 96—94 |
| 2,860,980 | 11/1958 | Milton | 96—94 |
| 3,026,202 | 3/1962 | Knox et al. | 96—94 |
| 3,030,209 | 4/1962 | Henn et al. | 96—94 X |
| 3,142,568 | 7/1964 | Nottorf | 96—87 |

NORMAN G. TORCHIN, *Primary Examiner.*

D. H. PRICE, D. D. RICCI, R. H. SMITH,
*Assistant Examiners.*